Oct. 30, 1928.                                                           1,689,854
C. W. BENICA
JOURNAL BOX
Filed June 9, 1926
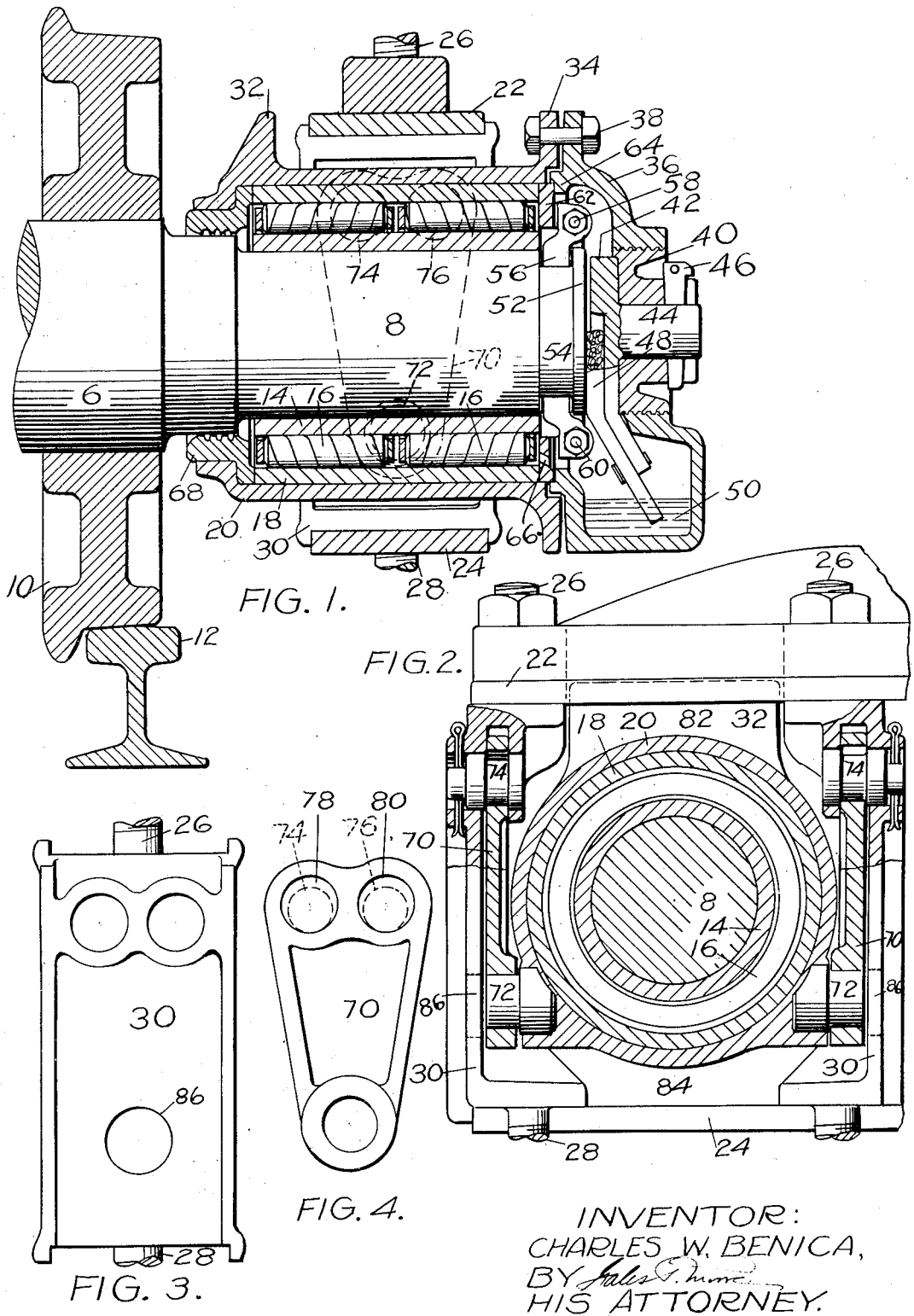
INVENTOR:
CHARLES W. BENICA,
BY Jules F. Munn
HIS ATTORNEY.

Patented Oct. 30, 1928.

1,689,854

UNITED STATES PATENT OFFICE.

CHARLES W. BENICA, OF BLOOMFIELD, NEW JERSEY, ASSIGNOR TO GENERAL MOTORS CORPORATION, OF DETROIT, MICHIGAN, A CORPORATION OF DELAWARE.

JOURNAL BOX.

Application filed June 9, 1926. Serial No. 114,854.

This invention relates to journal boxes and comprises all the features of novelty herein disclosed, by way of example, as embodied in a journal box construction for railway car axles and trucks.

An object of the invention is to provide an improved journal box for damping end thrust and decreasing the wear induced by relative side motion of axle and frame parts. Another object is to provide improved means for utilizing the weight of a car and load for absorbing shock. Still another object is to provide a box construction for centering the box with respect to the frame and equalizing the load on the bearings. Yet another object is to provide a journal box of this character which is readily adaptable to existing car constructions.

To these ends and to improve generally upon devices of this general character, the invention also consists in the various matters hereinafter described and claimed.

The invention, in its broader aspects, is not necessarily limited to the particular embodiment selected for illustration in the accompanying drawings in which:

Figure 1 is a central vertical section.

Figure 2 is a transverse section with some parts in end elevation.

Figure 3 is a front view of one of the pedestals.

Figure 4 is a front view of one of the links.

The numeral 6 indicates an axle with a journal 8 at each end, flanged wheels 10 supporting the axle and running on rails 12. Preferably each journal carries a hardened sleeve 14 for two sets of roller bearings 16 fitting in a sleeve 18 of an axle box 20. The axle box has provision for lateral and vertical movements with respect to a truck frame comprising upper and lower truck frame bars 22 and 24 clamped to upper and lower studs 26 and 28 offset from pedestals 30 towards the axle box to space the pedestals from the box. Flanges 32 and 34 on the box prevent excessive lateral movement by engagement with the truck frame-bars.

A cap or lid 36 is removably secured by bolts 38 to the flange 34 and carries a threaded nut 40 to which a thrust plate or button 42 is secured by a stud 44 and a key 46. A wick 48 in a recess of the thrust button extends down into an oil well 50 in an enlarged portion of the cap. The axle has at its end a thrust surface 52 opposed to and normally spaced a little from the thrust plate 42 and engages the latter upon a slight lateral movement of the wheels and axles to the right in Figure 1.

The axle also has a groove 54 carrying a split thrust collar 56 the sections of which are secured together by clamp bolts 58 and 60. The collar is arranged to engage a ring 62 upon slight lateral movement of the wheels and axles to the left in Figure 1, the ring 62 being clamped between the sleeve 18 and a flange 64 of the cap. Openings 66 near the bottom of the ring allow lubricant to pass between the well and the bearings. A flanged ring 68 at the inner end of the box forms an oil seal with the axle. Relative lateral movement between the axle and the box, due to inequalities in the track or to other causes, is permitted by the space between the thrust surface 52 and the thrust plate 42 and by the space between the split collar 56 and the ring 62.

An extended lateral shifting of the axle and wheels, such as movement induced by curves in the tracks, also causes lateral movement of the box which is yieldingly resisted or damped by load carrying link connections between the box 20 and the frame. Each link or strut 70 is here shown as substantially triangular and is rockably connected as by a pivot pin 72 to the bottom of the box and normally carries its share of the weight of the car and its load through a pair of spaced rockable connections such as grooved pins 74 and 76 secured by cotter pins in each pedestal. The grooved portions of the pins 74 and 76 are smaller than openings or eyes 78 and 80 in the link and when the axle is centered or nearly so, both pins rest on the bottoms of the openings and support the weight in equal degree. If sufficient lateral movement is transmitted to the box to the right in Figure 1, the links are swung counter clockwise, considering the right pivot pin 76 as the center, thereby tending to raise the truck frame and body parts, the left pivot pin 74 then having lost motion in its opening 78 in the link. The weight of the car and load resists this swinging movement and tends to restore the links and the axle box to their normal centered position with the weight equally distributed on both pins. Any extended movement of the axle and wheels to the left causes a movement of the box to the left; this swings the links clockwise and effects a corresponding lifting of the frame through the left pivot pins 74 while the right pivot pins 76 are idle. Conversely, any extended sway or lateral shifting movement of the frame and body with respect to the axle is resisted by the swinging of the links and the consequent necessity of lifting the frame and body. Thus, end thrust shock is damped and wear on wheel flanges and thrust surfaces, etc. is lessened. When the body and frame are regarded as the shiftable parts, the links may be considered as swinging about the pins 72 as the axis. There are lost motion spaces at 82 and 84 between the box and the frame bars 22 and 24 to allow for the relative vertical movement. The lower pivot pins 72 are centrally located on the box in a vertical plane normally passing between the spaced pins 74 and 76 so that the load is kept equally distributed on both roller bearings. Although roller bearings are illustrated, it is obvious that the link construction can be used with plain bearings.

The journal box is easily removable from the frame and axle and yet it is not easy to tamper with maliciously. The cap 36 and split collar 56 are first removed; then the frame is jacked up a little to take the load off the pins 74 and 76 so that these pins can be withdrawn; then the frame is jacked up enough more to allow the flange 32 to clear the frame bar 22. An opening 86 in the pedestal provides for inspection and access to the pin 72. The present improvement is readily adapted for application to existing truck frames where the space for an axle box is limited. The offsetting of the pedestals from their studs 26 and 28 provides space for the links at the front and rear of the box and the pedestals guide the links.

I claim:

1. In a device of the character described, in combination, an axle, an axle box having a bearing for the axle, a frame, and a load carrying connection between the axle box and the frame and comprising a link having a single pivot pin connection to one of said members, said link being connected to the other of said members by a pair of spaced pivot pins and said other member having openings larger than the pins to allow lost motion between the link and either one of the spaced pins; substantially as described.

2. In a device of the character described, in combination, an axle, an axle box having a bearing for the axle and a pivot pin, a frame having pivot pins, and a load carrying connection between the axle box and the frame and comprising a link connected to the pivot pin on the axle box and having openings engaging the pivot pins on the frame; substantially as described.

3. In a device of the character described, in combination, an axle, an axle box having a bearing for the axle and a pivot pin at its lower end, a frame having a pair of spaced pivot pins adjacent to the upper end of the box, and a load carrying connection between the axle box and the frame and comprising a link having its lower end connected to the pivot pin on the axle box, said link having a pair of spaced openings at its upper end sleeved over said spaced pins and having lost motion therewith; substantially as described.

4. In a device of the character described, in combination, an axle, an axle box having a bearing for the axle, a frame having upper and lower bars and pedestals uniting said bars at the front and rear of the axle box, and links rockably connected to the lower end of the axle box and having spaced rockable connections with the pedestals; substantially as described.

5. In a device of the character described, in combination, an axle having a flanged supporting wheel, an axle box having a bearing for the axle, a frame, means for allowing a relative lateral shifting between the frame and the axle box, a thrust member on the axle box opposing the end of the axle for taking end thrust in one direction, a thrust collar on the axle opposing a thrust member on the axle box for taking end thrust in the other direction, and connections between the frame and the axle box for causing the lateral shifting to damp end thrusts on said box in both directions; substantially as described.

6. In a device of the character described, in combination, an axle having a thrust face at one end, an axle box having a bearing for the axle, a frame, a thrust plate on the axle box opposing and normally spaced from the thrust face on the axle, a thrust ring on the axle box, and a thrust collar on the axle opposing and normally spaced from the thrust ring; substantially as described.

7. In a device of the character described, in combination, an axle having a thrust face at one end, an axle box having a bearing for the axle, a frame, a thrust plate on the axle box opposing and normally spaced from the thrust face on the axle, a thrust ring in the axle box, a thrust collar on the axle opposing and normally spaced from the thrust ring, and connections between the frame and the axle box for maintaining the weight of the frame and its load at the center of said axle box; substantially as described.

8. In a device of the character described, in combination, an axle box having a bearing for the axle, a frame comprising upper and lower bars and pedestals uniting said bars, the pedestals having their frame engaging ends offset towards the axle box to space the pedestals from the front and rear of the box, and links in said spaces and having their ends pivotally connected to the pedestals and to the axle box; substantially as described.

9. In a device of the character described, in combination, an axle box having a bearing for the axle, a frame comprising upper and lower bars and pedestals uniting said bars, the pedestals having their frames engaging ends offset towards the axle box to space the pedestals from the front and rear of the box, and links in said spaces, each link having pivoted connection with the box and with a pedestal, one of said connections comprising detachable pins engaging openings in the link; substantially as described.

10. In a device of the character described, in combination, an axle, an axle box having a bearing for the axle, a frame, a swinging link connection between the axle box and the frame to allow a generous relative lateral shifting of said members, a thrust plate on the axle box opposing a thrust surface carried by the axle and normally spaced slightly from said thrust surface, the space allowing a small amount of relative lateral shifting between the axle and the axle box without any relative shifting between the axle box and the frame, and the link connection damping the thrust between the thrust plate and the thrust surface carried by the axle when said thrust members come in contact; substantially as described.

In testimony whereof I hereunto affix my signature.

CHARLES W. BENICA.